June 28, 1966 F. C. GLEASON ETAL 3,258,119
APPARATUS FOR ORIENTING NECKED OBJECTS
Original Filed June 29, 1962 3 Sheets-Sheet 1
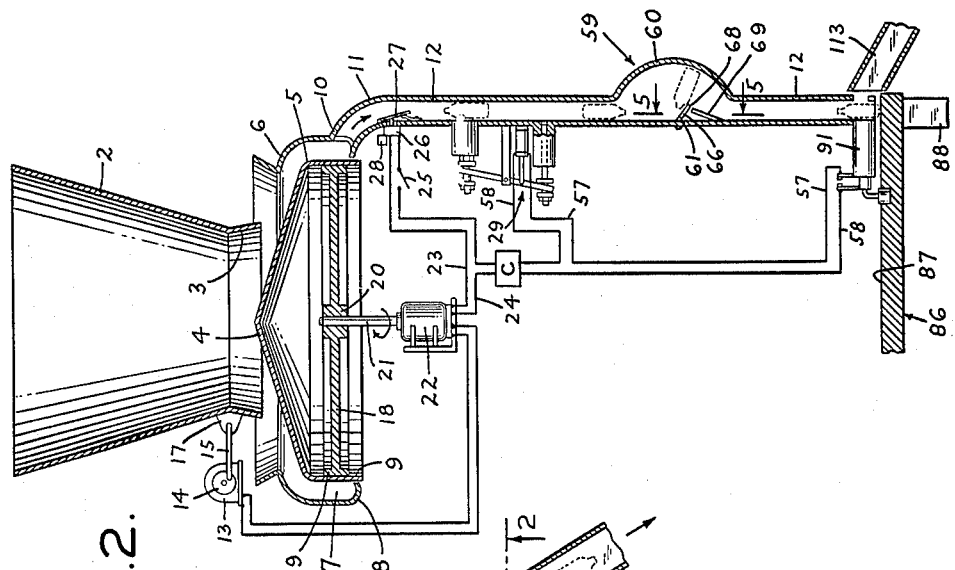
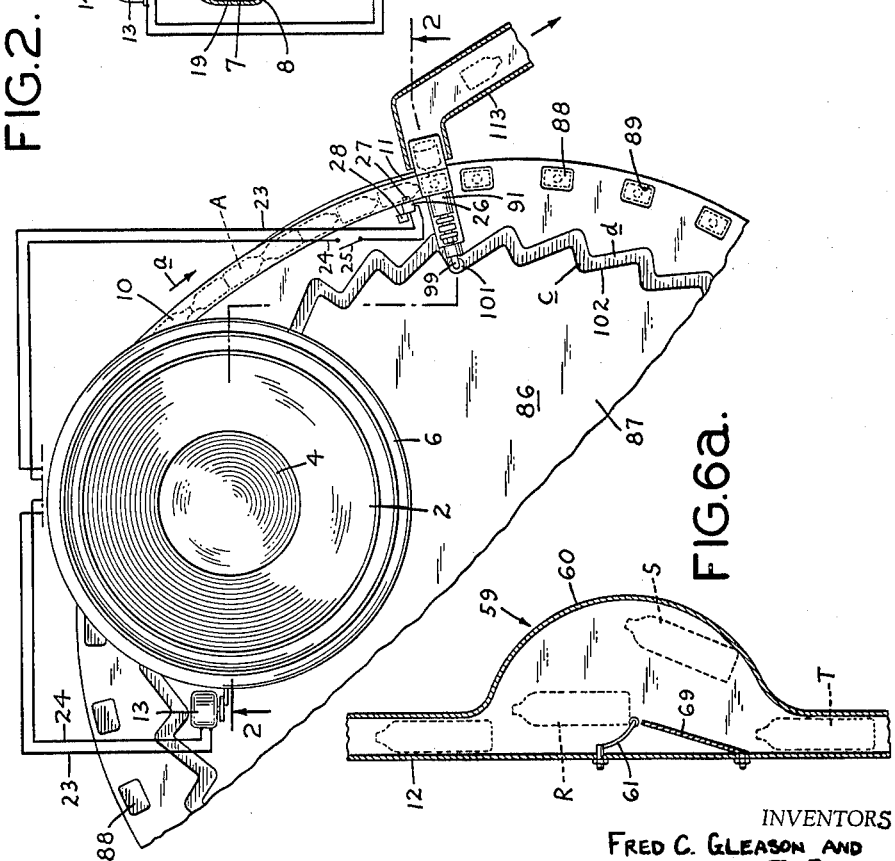
INVENTORS
FRED C. GLEASON AND
EDWARD E. BYRNES
BY Andrew Kafer June 28, 1966  F. C. GLEASON ETAL  3,258,119
APPARATUS FOR ORIENTING NECKED OBJECTS
Original Filed June 29, 1962  3 Sheets-Sheet 2
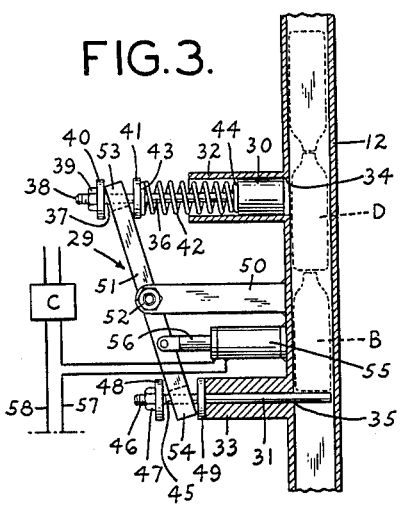
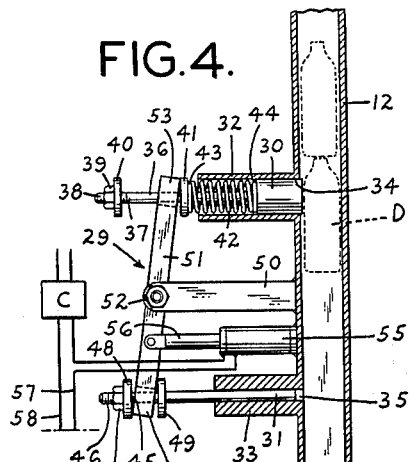
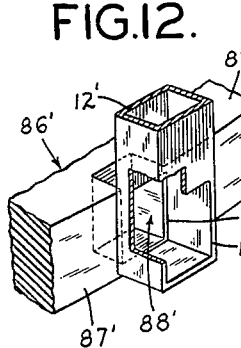
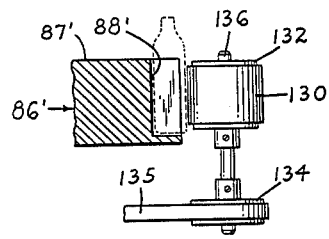
INVENTORS
FRED C. GLEASON AND
BY  EDWARD E. BYRNES
Andrew Kaffer June 28, 1966    F. C. GLEASON ETAL    3,258,119
APPARATUS FOR ORIENTING NECKED OBJECTS
Original Filed June 29, 1962    3 Sheets-Sheet 3
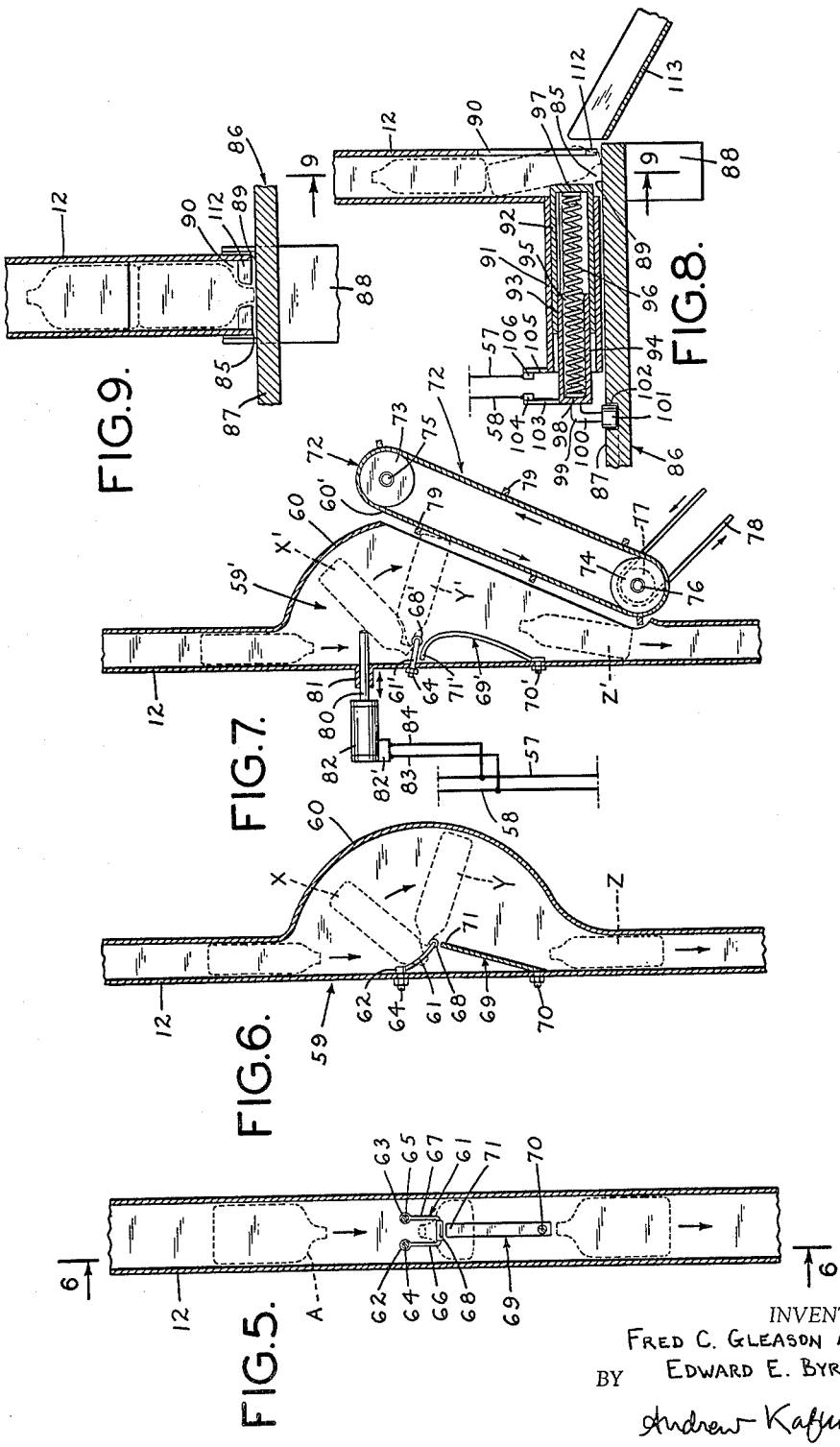
INVENTORS
FRED C. GLEASON AND
EDWARD E. BYRNES
BY
Andrew Kafko

United States Patent Office 3,258,119
Patented June 28, 1966

1

3,258,119
APPARATUS FOR ORIENTING NECKED OBJECTS
Fred C. Gleason, Cannondale, Conn., and Edward E. Byrnes, South Bend, Ind., assignors to American Home Products Corporation, New York, N.Y., a corporation of Delaware
Original application June 29, 1962, Ser. No. 206,480, now Patent No. 3,212,668, dated Oct. 19, 1965. Divided and this application July 9, 1965, Ser. No. 484,145
5 Claims. (Cl. 209—80)

This is a divisional application of Ser. No. 206,480, filed June 29, 1962, now Patent No. 3,212,668 issued Oct. 19, 1965.

The present invention relates generally to apparatus for orienting a series of objects of substantially similar configuration. More particularly the invention relates to apparatus for automatically orienting a series of objects each of which consists essentially of a larger main body and a smaller neck portion at the top of said main body.

While not restricted thereto, the invention is particularly useful for orienting plastic, top-necked bottles, preparatory to the automatic filling and capping of said bottles as they are conveyed on a feed line. With the ever-widening acceptance of the packaging of liquid products in plastic bottles, it has become an increasingly greater problem to provide dependable, rapidly-operating, substantially fully automatic means for orienting large quantities of plastic bottles and loading them into separate pockets in an index table preparatory to filling and closing of the bottles, for replacing the conventional laborious, time-consuming and costly manual operations.

With the foregoing in view, it is a primary object of the present invention to provide a simple, highly efficient and economical apparatus for automatically orienting a plurality of top-necked bodies preparatory to use of such objects.

It is another object of the invention to provide apparatus of the character referred to above and which is of particular utility for orienting plastic bottles and similar objects preparatory to positioning such bottles or objects in a series of conveying pockets.

It is another object to provide apparatus of the character referred to above wherein the objects are dumped haphazardly into a hopper and are thereafter automatically fed, sequentially, to orienting means, properly oriented by the orienting means, and finally sequentially aligned at the discharge end of the apparatus.

It is another object of the invention to provide such apparatus which positively assures orienting of the objects at the discharge end and ejects from the system unoriented objects prior to the arrival thereof at the discharge end of the apparatus.

Yet another object of the invention is to provide compact apparatus of the nature described which has the various components thereof co-actively and spatially related to each other whereby the orienting function is positively assured and performed within a minimum space.

Another object is to provide means for discontinuously discharging objects from a hopper in which they are in haphazard relationship and feeding them substantially continuously and singly in initially oriented manner to a finally orienting mechanism.

Another object is to provide such initially orienting assembly which comprises an open bottomed vibratory hopper having positioned therebelow the conical surface of a rotating cone provided with means to form an annular channel around the periphery of the latter in turn provided with a tangentially-disposed conduit of predetermined restricted cross-section.

Another object is to provide metering or escapement means which assure discharge of initially oriented objects from the initial orienting assembly at predeterminable

2 substantially constant intervals to the final orienting means.

It is yet another object to provide an orienting assembly that is capable of furnishing fully oriented top-necked objects at a rate upwards of 120 objects per minute and well above 200 objects per minute if the gravitational acceleration of the objects is augmented as discussed hereinafter.

Another object is to provide an orienting assembly comprising a restricted loop adapted to receive the necks of bottles falling neck down, and cause 180° turning of the bottles in their downward path; and to partially divert said necked bottles striking the loop bottom first, without changing the orientation of the bottles as they continue to move downwardly.

Another object is to provide a testing assembly for positively assuring that any unoriented objects received thereby are forceably ejected from the assembly prior to delivery at the discharge end thereof.

Yet another object is to provide an index table having object-receiving pockets each of which is automatically and sequentially filled with one of the oriented objects delivered by the orienting assembly.

Other objects and advantages of the invention will become apparent as a result of a better understanding thereof upon reference to the following description.

Generally, in accordance with the present invention, the apparatus for orienting a series of generally elongated objects having a neck end of substantially smaller cross-sectional dimensions than are the cross-sectional dimensions of the other end, comprises a substantially vertical chute adapted to permit passing of the elongated objects axially therethrough; means in communication with the upper region of the chute for furnishing elongated objects axially and seriatim thereto; escapement means located in the chute below the upper region thereof for causing the elongated objects to move downwardly and axially in the chute one at a time; orienting means located in the chute below the escapement means for receiving the elongated objects from the escapement means and causing those objects that are moving downwardly with the neck ends thereof leading, to be given a substantially 180° turn to reverse their orientation as they continue their downward movement, and permitting those objects that are moving downwardly with the larger dimensioned ends leading, to continue to do so; testing means located in the chute beneath the orienting means to cause removal of improperly oriented objects from the chute prior to normal discharge from the latter; and index table means having pockets therein and movable with respect to the discharge end of the chute for seriatim communication with the discharge end of the chute for loading of properly oriented objects at the discharge end of the chute into the pockets of the index table. Preferably, the means for furnishing the elongated objects to the upper region of the chute is provided with sensing means for rendering the first-named means operative upon demand for objects in the upper region of the chute, and the escapement means and testing means are caused to release a single object and to remove an improperly oriented object, respectively, by means actuated by movement of the index table.

In a preferred embodiment of the invention, the apparatus comprises a vibratory open bottom hopper adapted to contain the top-necked objects described which are to be oriented; a rotating cone with the apex thereof beneath the open bottom of said hopper and provided with a peripheral wall defining an annular passageway in communication with a tangentially disposed conduit of a cross-sectional dimension substantially equal to the cross-sectional dimension of the objects to be oriented; a substantially vertical chute having its upper end in communication with said conduit and provided therein with escapement means for causing the initially oriented objects coming from said conduit to be halted and to pass intermittently beyond said escapement means one at a time; an orienting chamber in said chute below said escapement means and provided with loop means for intercepting objects and to cause those objects moving downwardly in said chute with the necks thereof leading, to be given a 180° turn to reverse their orientation, and to cause objects which reach the chamber with their larger ends leading, to continue downwardly in the same manner; piston and die testing means located beneath said orienting means to cause removal of improperly oriented objects from said chute prior to reaching the lower discharge end thereof; and index table means provided with pockets which are carried in seriatim aligned communication with the said discharge end of said chute for loading of a properly oriented object from said discharge end of said chute into an aligned pocket of said index table.

In a particularly preferred embodiment of the vibratory hopper rotating cone initial orienting assembly, particularly useful in the apparatus just described; the hopper, which is adapted to contain the top-necked objects, is provided with an open bottom and inclined wall means adapted to direct the objects in the hopper towards said open bottom. Positioned beneath the open bottom of the hopper is the conical surface of a rotatable cone which has around its substantially vertical periphery a guard wall which with the peripheral edge of the cone defines an annular chamber. In communication with the annular channel and substantially disposed tangentially thereof is a conduit which has a cross-section substantially equal to that of the necked objects to be oriented.

In a particularly preferred embodiment of the orienting assembly, particularly useful in the apparatus described; the chute, which is adapted to receive the top-necked objects seriatim, comprises wall means providing a restricted passageway of predetermined cross-sectional dimensions adapted to conduct top-necked objects axially seriatim from the upper region of the chute to a lower region thereof, the chute also comprising an intermediate region defined by the wall means providing a large passageway of substantially increased cross-sectional dimensions adapted to permit an end-over-end half-turn of objects passing within the chute; orienting means extending into the chute in the intermediate region of increased cross-sectional dimensions and adapted to intercept containers moving downwardly in the chute, the orienting means comprising a looped portion defining an opening of predetermined, restricted cross-sectional dimensions whereby necked objects engaging the looped portion with their smaller dimensioned top-necked ends directed downwardly will have the necks thereof extend into the loop and held momentarily while the objects are caused to make an end-over-end half-turn thereon in the larger passageway so that the orientation of the objects in the lower region of the chute is reversed, while top-necked containers engaging the looped portion with their larger dimensioned bottom ends will be directed into the larger passageway and then into the lower region of the chute without reversal of orientation. To augment the functioning of the orienting means, the latter may be provided with piston means located above the loop and reciprocable toward the larger passageway for urging the objects engaging the loop into the enlarged passageway of the chute. The orienting means may also be provided with a downwardly moving wall for the enlarged passageway opposite the loop to assure downward movement of objects that have moved off the loop.

In a particularly preferred embodiment of the ejector and index table means assembly, the index table means comprises a plurality of pockets each positionable seriatim in alignment with a chute having the lower discharge end thereof operatively associated with the index table, each of the pockets being adapted to receive a properly oriented top-necked object from the discharge end of the chute; ejector means that are operatively associated with the chute above the discharge end, the ejector means comprising a testing die formed by a wall of the chute and adapted to permit passage of an object therethrough in inverted unoriented position and to prevent passage of an object in proper oriented position prior to alignment of the discharge end of the chute with one of the pockets in the index table; and means to cause transfer of a properly oriented object from the discharge end of the chute into a pocket of the index table when the pocket moves into alignment with said discharge end. The means to cause said transfer may comprise the surface of the index table itself through which the open tops of the pockets are presented. In this arrangement, when the area between adjacent open-topped pockets is presented below the discharge end of the chute, such area functions as a stop for an object in said end. When the open top of a pocket is presented below said end, it functions as an escapement to permit the object to move from said end downwardly into said pocket. In another embodiment of the transfer means, the pockets may be open-sided for in seriatim alignment with the, in this case, open-sided discharge end of the chute. Cam follower means may be provided which utilize the side edge of the index table and the open sides of the pockets as a camming surface for said follower means which is thus actuated to push an object laterally through the open side of the chute into the open-sided pocket aligned therewith.

A specific embodiment of the invention and several modifications of components thereof will now be described with reference to the accompanying drawings wherein FIG. 1 is a top plan view of an orienting device in accordance with the present invention, in which view only part of the index table is shown;

FIG. 2 is a vertical section of FIG. 1 taken generally on section line 2—2 of the latter;

FIG. 3 is an enlarged vertical section of the escapement means shown in FIG. 2, the parts being shown in position wherein passing of bottles beyond the escapement means is prevented;

FIG. 4 is an enlarged vertical section similar to FIG. 3 showing the parts in position wherein a single bottle has been dropped past the escapement and the remaining bottles in the upper region of the chute are prevented from moving to the lower escapement release;

FIG. 5 is an enlarged vertical section of the orienting chamber shown in FIG. 2 and taken on section line 5—5 of the latter;

FIG. 6 is another enlarged vertical section of the orienting chamber shown in FIG. 2, but taken on section line 6—6 of FIG. 5, with the various positions of a bottle passing therethrough shown in broken lines for indicating the action of the orienting chamber when a bottle enters the chamber in inverted attitude;

FIG. 6a is a vertical section of the orienting chamber shown in FIG. 2 similar to the section shown in FIG. 6, but with the various positions of a bottle passing therethrough shown in broken lines for indicating the action of the same orienting chamber when a bottle enters the chamber in already properly oriented attitude;

FIG. 7 is an enlarged vertical section of an orienting chamber similar to that shown in FIGS. 2, 5 and 6, but modified for augmenting the operation thereof;

FIG. 8 is an enlarged vertical section of the testing and ejecting assembly and of the adjacent index table assembly structure shown only partly in section in FIG. 2;

FIG. 9 is a vertical section of the assembly shown in FIG. 8 and taken on section line 9—9 of the latter;

FIG. 10 is a plan view of a fragment of a modified form of index table and bottle inserter mechanism, parts being broken away to show the cam follower structure;

FIG. 11 is a vertical sectional view of the structure shown in FIG. 10 taken generally on section line 11—11 of the latter; and FIG. 12 is a perspective view of the chute and adjacent index table structure shown in FIG. 10 taken in the general direction of arrow 12 of the latter figure, but with the inserter arm removed.

As best seen in FIG. 2, the orienting device comprises a vibratory hopper 2 which has its open bottom 3 overlying the apex region 4 of a rotating cone 5. A fixed perimeter guard 6 surrounds the periphery of rotating cone 5 and is spaced therefrom to provide an annular channel 7 having a width that is substantially equal to the thickness (i.e., the narrower cross-sectional dimension) and less than the width (i.e., the wider cross-sectional dimension) of the bottles to be oriented. The bottom of channel 7 is closed by a wall 8 extending from the lower edge of perimeter guard 6 and extending inwardly but short of actual engagement with the lower periphery 9 of cone 5 so as not to interfere with the rotation of the latter.

As best seen in FIG. 1, a conduit 10 having cross-sectional dimensions which are restricted whereby the necked elongated bottles A to be oriented are permitted to pass therethrough only axially thereof while lying on one of their narrow sides, is in communication with the lower region of annular channel 7 and extends therefrom substantially tangentially thereof. Tangential conduit 10 merges via a downwardly curved portion 11 thereof into a downwardly directed chute 12, which for the major portion of its length, is disposed substantially vertically as shown in FIG. 2. Chute 12 has cross-sectional dimensions which are substantially equal to those of conduit 10, whereby the elongated bottles A passing therethrough are conducted axially thereof with the notable exception referred to hereinafter.

Hopper 2 is mounted by mounting means (not shown) which permit vibratory movement of the former. Means for causing vibratory movement of hopper 2 on said mounting means are provided which comprise an electric motor 13 having drive wheel 14 to which is eccentrically connected one end of a piston rod 15, the other end of which rod is pivotally connected at 16 to an ear 17 affixed to the lower end of hopper 2.

Cone 5 is mounted for rotation by means comprising a wheel 18 affixed at its rim 19 to the interior of the cone. Wheel 18 is supported at its hub 20 by a drive shaft 21 of a second electric motor 22.

Electric motors 13 and 22 are connected in parallel by leads 23 and 24, with the latter having interposed therein, a source of current C. A manual on-off switch 25 is provided for the circuit in lead 24. Also interposed in the circuit for connection between leads 23 and 24 is a microswitch 26 which is positioned on the upper portion of chute 12 with the feeler 27 thereof extending into the interior of chute 12. Feeler 27 functions to close microswitch 26 upon sensing of "empty-chute" conditions to cause completion of the electric circuit comprising leads 23 and 24 (provided, of course, that manual switch C is closed) whereby hopper 2 is vibrated and cone 5 is rotated. Microswitch 26 is preferably provided with a time-delay device 28 of conventional design, whereby normal intermittent sensing of apparent "empty-chute" conditions (as spaces between adjacent bottles moving downwardly are presented to feeler 27) does not cause fluttering energization of motors 13 and 22.

Located in the upper region of chute 12, but below microswitch 26, is an escapement mechanism 29. As best seen in FIGS. 3 and 4, escapement mechanism 29 comprises a holding piston 30 and a release slide 31. Holding piston 30 and release slide 31 are respectively mounted for reciprocation in a tube 32 and a sleeve 33, both of which are mounted on chute 12 and disposed substantially perpendicularly thereto. Tube 32 and sleeve 33 are open ended with their respective right ends (as viewed in FIGS. 3 and 4) having respective openings 34 and 35 in communication with the interior of chute 12 whereby piston 30 and slide 31 may be caused to extend into said chute 12 in a manner and for the purposes described hereinafter.

Attached to piston 30 for axial movement therewith is a piston rod 36. Piston rod 36 has the distal end portion 37 thereof threaded at 38 to receive a nut 39 which retains a washer 40 on rod 36 and adjustably limits axial movement of said washer to the left as viewed in FIGS. 3 and 4. A second washer 41 is mounted on piston rod 36 for reciprocation axially thereof and is biased towards the left as viewed in said figures by a compression spring 42 which is attached to washer 41 at 43 and encircles the right hand portion of piston rod 36 and abuts the left end of piston 30 at 44, to provide a lost motion assembly as will appear hereinafter. Release slide 31 also has the distal end portion 45 thereof threaded at 46 to receive a nut 47 which similarly adjustably retains a washer 48 on slide 31. In this case, a second washer 49 is affixed to slide 31 for movement therewith.

Also affixed to the exterior surface of the wall of chute 12, but midway of the distance between tube 32 and sleeve 33, is a lever arm mounting standard 50 which is provided at its left end with an aperture (not visible). A lever arm 51 is pivotally mounted at its midpoint on standard 50, by means of a screw, nut and washer assembly 52 affixed via an aperture (also not shown) which is in alignment with the aperture in standard 50. The ends of lever arm 51 are respectively bifurcated at 53 and 54. The legs of bifurcation 54 extend at either side of slide rod 39 between washers 48 and 49 thereon.

Also mounted on the exterior surface of the wall of chute 12 is a solenoid 55, the armature arm 56 of which is pivotally attached to the lower reach of lever arm 51. The coil (not visible) of solenoid 55 is energized via leads 57, 58 in a manner described hereinafter. The core (also not visible) of the solenoid 55 is loosely fitted within said coil thereof whereby limited vertical shifting of arm 56 upon horizontal reciprocation thereof may occur in a well-known manner to assure operability of the parts. Thus, arm 56, upon de-energization of solenoid 55, may freely assume the withdrawn position shown in FIG. 3 due to action of the usual biasing spring (not visible) on the core, and also the extended position shown in FIG. 4 upon centering of the core within solenoid 55 (against the biasing action of said spring) when the coil is energized through said leads 57 and 58.

Below escapement mechanism 29 there is provided an orienting chamber 59. As best seen in FIG. 6, orienting chamber 59 comprises a substantially curvilinear wall 60, which extends outwardly from the normal plane of the wall of chute 12, and then inwardly thereto, about an axis to be defined hereinafter. A comparatively large loop 61 (FIGS. 5 and 6), of dimensions and extent also described hereinafter, is supported at its looped ends 62 and 63, each of which is attached to the wall of chute 12 by means of a respective screw and nut assembly 64, 65. Loop 61 has the arms 66 and 67 thereof extending downwardly and forwardly, and joined by a cross bar 68. Loop arms 66 and 67 are spaced apart a distance, and cross bar 68 is positioned a distance past the axis of chute 12, whereby the narrower necks of bottles descending within chute 12 may enter within loop 61, but the bottle bodies, which are of greater cross-sectional dimensions than loop 61, may not enter therein. As appears in FIG. 6, cross bar 68 is the axis around which curvilinear wall 60 is generally circumscribed at a distance which is at least equal to the length of the bottles being oriented (exclusive of the necks thereof). A bar 69, affixed at its lower end to wall 12 by means of a screw and nut assembly 70, has the upper end 71 thereof positioned beneath cross bar 68 to provide additional support for loop 61. Wall 60 at its lower end merges again with the wall of the lower portion of chute 12 which has substantially the same cross-sectional dimensions as the upper portion of said chute 12.

In FIG. 7, there is shown a modification of the orientation chamber 59 illustrated in FIGS. 5 and 6. In accordance with this modified embodiment of the chamber, the lower half of curvilinear wall 60 of chamber 59' is replaced by the inclined upper surface 60' of a belt 72 mounted on an upper roller 73 and a lower roller 74. Rollers 73 and 74 are respectively provided with shafts 75 and 76 affixed thereto for rotation therewith. Also mounted on lower shaft 76 for rotation therewith is a pulley 77 (shown in phantom), over which is looped a driving belt 78, only part of which appears in FIG. 7. The other end of driving belt 78 is operatively connected to driving means (not shown) which are adapted to drive belt 78, and hence belt 72, in the respective directions indicated by the arrows. The entire exposed surface of endless belt 72 is provided with a plurality of horizontally extending cleats 79 uniformly spaced apart a distance slightly greater than the overall length of the bottles being oriented.

To augment the action of the endless belt in its function of implementing the normal gravitational movement of the bottles falling or swinging downwardly off loop 61' in orienting chamber 59', there is provided a plunger 80 which is reciprocal in an open-ended tube 81 affixed to the straight wall of chute 12 opposite curvilinear wall 60, for positively pushing bottles off loop 61', as indicated at X'. Plunger 80 is mounted on the core (not visible) of solenoid 82 which is periodically energized via leads 83, 84, in a manner later described, to cause said core and plunger 80 to move to the right as viewed in FIG. 7 against the biasing action of the usual spring (not visible) in solenoid 82.

As best seen in FIGS. 8 and 9, the bottom end of chute 12 is open at 85 immediately above a rotatable index table 86, whereby the upper surface 87 of the latter in effect functions as a stop for bottles in chute 12. Located close to the periphery of table 86 and equally spaced therearound, are a plurality of pockets 88, each having a mouth 89 through the upper surface 87 of table 86 and dimensioned for completely receiving a single bottle in upright position. As seen in FIG. 1, mouths 89 are located in the upper surface 87 of table 86 whereby, upon rotation of the latter in the direction of arrow a, said mouths 89 are presented for sequential alignment with the lower open end 85 of chute 12. Thus, in effect, the upper surface 87 of index table 86 functions as an escapement mechanism which retains bottles in the bottom of chute 12 until a mouth 89 of a pocket 88 is brought into alignment with open end 85, whereupon a bottle drops through said mouth into said pocket and is carried away as table 86 rotates further.

Although orienting chambers 59 and 59' function to orient bottles so that the latter enter the lower end of chute 12 with their necks upward, it is at least possible that a bottle may, under certain circumstances, enter the lower portion of chute 12 in improperly oriented condition (i.e., with the neck thereof directed downwardly). For such contingency there are provided bottle testing and removing means described below.

In the wall of chute 12 that faces outwardly of the periphery of table 86, there is a die opening 90 which is in the general shape of a bottle in improperly oriented position (i.e., with the neck thereof directed downwardly and resting on upper surface 87 of table 86). Accordingly, as will be apparent, the lowermost wall portions 112 of chute 12 which define the inverted bottle contour, function as stops to prevent passage through die 90 of properly oriented (upright) bottles in the bottom of chute 12. On the other hand, improperly oriented bottles may pass through die 90 and into an inclined open chute 113 positioned below die opening 90 for receiving such bottles and conducting them to a location (not shown) from which, for example, the bottles may be taken for recycling through the orienting device by reintroduction into hopper 2. In the wall of chute 12 opposite said die opening 90, there is mounted a tube 91 open at both ends thereof and in which a hollow piston 92, open at end 93, is slidably maintained for reciprocation therein. Hollow piston 92 has a second similarly hollow, smaller diametered piston 94 telescoped within the open end 93 of hollow piston 92. Smaller hollow piston 94 is also open at its interior end 95. Telescoped pistons 92 and 93 are maintained in operative relationship within tube 91 by means of a spring 96 attached at its ends to the inner surfaces 97 and 98 of pistons 92 and 93, respectively, and by additional means now to be described.

The outer end of inner piston 93 is attached to a right-angled cam follower rod 99, which has affixed to its lower vertical reach 100, a cam 101. Cam 101 rides, and is retained in, a trackway 102 provided in the upper surface 87 of index table 86. As appears in FIG. 1, trackway 102 is of a sinuous configuration in plan whereby upon rotation of table 86, cam 101 is caused to move alternately in portions c of trackway 102 in comparatively rapid testing strokes in the direction of the periphery of table 86 and then in portions d of trackway 102 in a general direction away from the periphery of table 86 for a more gradual withdrawal stroke.

There is also provided on the exterior surface of the exposed end of piston 94, a resilient switch member 103 having a metal contact piece 104 insulated therefrom. For cooperative action with switch member 103 and its contact piece 104, there is mounted on the exterior surface of tube 91, a complementary switch member 105, which carries insulated therefrom, a metal contact piece 106 in alignment with contact piece 104. Respectively connected to contacts 104 and 106, are leads 57 and 58 which, as referred to hereinbefore, are connected to solenoid 55. Lead 58, as appears from FIG. 2, has interposed therein the electric current source C.

In the use and operation of the orienting mechanism described above, hopper 2 is filled in haphazard fashion with a plurality of the bottles to be oriented, the lowermost bottles resting on the apex surface 4 of the now stationary cone 5. Thereafter manual switch 25 is moved to closed position and since feeler 27 is sensing the "empty-chute" condition in chute 12, after a predetermined delay occasioned by time-delay device 28, microswitch 26 completes the circuit between the source of current C and electric motors 13 and 22 via leads 23 and 24. Energized motors 13 and 22 respectively cause vibration of hopper 2 and rotation of cone 5. Due to the centrifugal action of apex 4 of rotating cone 5 on the bottles resting thereon, said bottles are slung outwardly and into the confined area or channel 7 defined by skirt 6, which causes the bottles to be positioned on their narrower edges. Due to vibration of hopper 2, the bottles therein move downwardly to replace those slung off cone 5 into channel 7. Frictional engagement of the vertical periphery of cone 5 with the surface of the bottles urges the latter tangentially of the rotating surface of cone 5. However, because of the constricting action of the peripheral wall 6, the bottles are caused to move in channel 7, and when a properly oriented bottle is aligned with the opening into tangential chute 10, such bottle is caused to enter said chute either neck or bottom first.

As the bottles build up one behind the other in tangential chute 10, the foremost bottle approaches the downwardly directed portion 11 of chute 10 and, due to gravity, begins to fall. As such time it passes feeler 26, but because of the no more than momentary engagement of feeler 26 and the falling bottle, time-delay device 28 assures continuous operation of electric motors 13 and 22. The bottles continue their fall in chute 12, axially thereof with the necks of the bottles directed either upwardly or downwardly. Since the normal positions of piston 30 and slide 31 in escapement 29 are as shown in FIG. 3, the bottles are prevented from falling further in chute 12 by slide 31 projecting beneath the lowermost bottle. During this time other bottles may fall into chute 12 and stack up one above the other as indicated in FIG. 3, until they back up to the region of feeler 27 of microswitch 26, as will appear from inspection of FIG. 2. After a period of time caused by time-delay relay 28, microswitch 26 functions to break the circuit from electric power source C via leads 23, 24, and thereby deenergizes electric motors 13 and 22 to discontinue supply of bottles to chute 12.

The driving means (not shown) for index table 87 are then separately energized to cause rotation of said table, and with it trackway 102, in the direction of the arrow *a* in FIG. 1. As cam 101 rides in trackway 102, the former periodically enters into a portion *c* thereof whereby cam 101 is urged substantially radially toward the periphery of table 86 to cause movement of piston 94 and therewith switch member 103 to the right as viewed in FIG. 8 until switch contact piece 104 engages switch contact piece 106 to close the circuit from electric source C via leads 57, 58 to solenoid 55. Energization of solenoid 55 causes centering of the core thereof against its biasing spring, whereby piston rod 56 is moved toward the left as viewed in FIG. 3, to cause pivoting of lever arm 51 to the position shown in FIG. 4. As appears in the latter figure, slide 31 is withdrawn from chute 12 to release the lowermost bottle B previously retained thereby. However, since piston 30 need travel a comparatively short distance before it engages the side of the bottle D that was positioned just above the one (B) being released, retention of the engaged bottle D (and those above it) is assured prior to full release of lowermost bottle B. The lost motion assembly including axially movable washer 41 and spring 42 permits the additional travel of bifurcated end 53 of lever 51 to permit the full stroke of the lower bifurcated end 54 for completely removing slide 31 from chamber 12 and ultimately releasing bottle B.

The released bottle B continues downwardly, and, if it is oriented within its bottom in the lowermost position as indicated at R in FIG. 6*a*, said bottom engages the upper surface of inclined loop 61. Since the large dimensioned bottle bottom may not enter the smaller loop 61, the former is merely deflected bodily to the right and downwardly as indicated at S. The bottle then continues downwardly until it contacts the lower curved region of wall 60 of the orienting chamber 59 and is thereby deflected and directed into the lower continuation of chute 12 with the bottom of the bottle still leading as at T.

In the case of a bottle falling in chute 12 with its neck in the lowermost position, as indicated in FIG. 6, the neck is engaged in inclined loop 61 and held by cross bar 68 as the bottle, due to gravity, moves to the broken line position X and thereafter position Y and continues to pivot further on cross bar 68 of loop 61 until the bottom portion of the bottle is well below the neck thereof. By this continuing pivotal action the neck of the bottle is completely released from loop 61 and the bottle proceeds downwardly in properly oriented position as indicated at Z.

In the event the modified orienting chamber of FIG. 7 is used instead of that of FIGS. 1, 5 and 6, endless belt 72 is continuously driven in the direction of the arrows by driving belt 78 during operation of the orienting device. Each time that contacts 104 and 106 close the circuit to electric power source C via leads 57, 58 to actuate escapement solenoid 55, and hence cause retraction of slide 31 from chute 12 to release a bottle B; solenoid 82 is synchronously energized via leads 83, 84, but in each instance after a predetermined delay caused by time-delay device 82'. The delay period of device 82' is adjusted so that rod 80 extends to the right against a bottle supported no more than momentarily on loop 61' only after it has had time to fall from escapement 29. In this manner, rod 80 augments the natural gravitational action on the bottle which has contacted loop 61' to urge the bottle to position X'.

The bottle continues its urged swing around loop 61' to position Y' whereupon cleats 79 on the exposed surface 60' of endless belt 72 moving in the direction of the arrows, continue to urge the bottle downwardly into the lower region of chute 12 as indicated at Z'. As in the case of escapement chamber 59, bottles entering chamber 59' in properly oriented condition continue through the latter chamber without change of orientation, but in this case are merely additionally urged off loop 61', by the intermittently projecting rod 80, and downwardly in the chamber toward the lower region of chute 12 by the continuously moving belt 60'.

Each bottle leaving chamber 59 (or 59') continues to fall in chute 12 until it is stopped by the upper surface 87 of table 86 between open mouths 89 of pockets 88. As table 86 moves in the direction of the arrow *a* in FIG. 1, the open mouth 89 of the next adjacent pocket 88 comes into alignment with the open bottom 85 of chute 12, whereupon the bottle therein drops into said pocket 88 and is carried away by further rotation of table 86. The surface 87 of table 86 between the pocket 88 first referred to and the next adjacent pocket 88 then functions as a stop for the next bottle dropping to the open bottom 85 of chute 12. During the sliding of said next bottle on the surface 87 of table 86 between pockets 88, section *c* of trackway 102 is presented to cam 101 whereupon said cam, and with it pistons 92 and 94 are urged towards the right as viewed in FIG. 8. In the event the bottle in the bottom of chute 12 is properly oriented, such bottle is prevented from any lateral movement to the right by wall portions 112 which define the bottom part of die opening 90. Hence, the motion of larger piston 92 to the right is stopped by the body of the properly oriented bottle and the lost motion of piston 94 is taken up by compression spring 96 therebetween. However, if, as infrequently may occur, the bottle in the bottom of chute 12 is improperly oriented, movement of piston 92 to the right pushes such bottle through die opening 90 (past wall portions 112) and into takeaway chute 113, as indicated in FIGS. 8 and 9.

In a modification of the bottom chute structure and index table means illustrated in FIGS. 10 and 11 and 12, chute 12 is provided with opposed side openings 121 and 122 (best seen in FIG. 12). The side opening 121 (to the left as viewed in FIG. 10) has alignable therewith in sequence spaced pockets 88', which in this case are located in the periphery of index table 76', to open out on the side edge surface 77' of said table as well as at the top surface thereof. Pivotally mounted beside the periphery of index table 76' on a shaft 123 is a lever plunger arm 124 which has the plunger end 125 in alignment with the opening 122 in the right side of chute 12'. Plunger arm 124 is urged to the left (FIG. 10) by means of spring 126 mounted between said plunger arm 124 and a support 127 shown in fragment whereby plunger end 125 tends to enter said opening 122. Mounted by means of pin 128 at the other end of plunger arm 124 in the region closer to pivot shaft 123 is a cam wheel 129. Cam wheel 129 is positioned so that it rides on the peripheral edge 77' of table 76' and is in aligment with the side opening of a pocket 88' in table 76' at the time the open side 121 of chute 12' is in alignment with another pocket 88'.

Beyond chute 12' in the direction of rotation of 76' is an endless belt 130 which is mounted on a pair of rollers 131 and 132, and has one surface 133 thereof in abutment with the periphery 87' of table 76' to function as a closure for the pockets 88' passing thereby. Beyond endless belt 130 in the direction of rotation of table 76', a rail 134 takes over the function of retaining bottles inserted in pockets 86' of index table 76' until they are removed for filling at a station (not shown). As shown in FIG. 11, roller 132 has mounted on the shaft 136 thereof for rotation therewith a driven pulley 134 around which is looped driving belt 135 which in turn is connected to the driving mechanism (not shown) of table 76'.

As will be apparent, in the operation of the modification of the chute and index table assembly just described, bottles coming to the closed end of chute 12' are forced sideways via side opening 121 in chute 12' and into an aligned pocket 86' by means of the end 125 of plunger arm 124 which is forced to the left by spring 126, when cam wheel 129 entering another of pockets 86', permits such actions.

It will be understood that the above-described embodiments of the present invention are merely illustrative thereof, and that many other arrangements and embodiments of the apparatus and/or of the components thereof may readily be devised by those skilled in the art without departing from the spirit and scope of the invention as set forth in the appended claims.

We claim:

1. Apparatus for positioning a series of generally elongate objects having a neck end of substantially smaller cross-sectional dimensions than are the cross-sectional dimensions of the other end, said apparatus comprising:
   (1) a chute, said chute having a lower discharge end;
   (2) an index table, said index table comprising a plurality of pockets each adapted to receive a single necked object, said pockets being positionable seriatim in alignment with said lower discharge end of said chute (1);
   (3) ejector means operatively associated with said chute above said discharge end thereof comprising a testing means in a wall of said chute for permitting passage of a necked object therethrough when in inverted unoriented position and to prevent passage of such object when in proper oriented position, and pusher means for pushing objects in said chute against said testing means; and
   (4) means to cause transfer of a properly oriented object from the discharge end of the chute into a pocket of the index table when the pocket moves into alignment with said discharge end.

2. Apparatus for positioning a series of generally elongate objects having a neck end of substantially smaller cross-sectional dimensions than are the cross-sectional dimensions of the other end, said apparatus comprising:
   (1) a chute, said chute having a lower discharge end for permitting axial discharge of a single necked object at a time;
   (2) a rotatable index table, said index table comprising a plurality of pockets located circumferentially and each adapted to receive a single necked object, said pockets being positionable seriatim in alignment with said lower discharge of said chute (1) upon rotation of said table (2);
   (3) ejector means operatively associated with said chute above said discharge end thereof, said ejector means comprising a testing die formed by a wall of said chute, said testing die comprising an opening having a configuration adapted to permit passage of a necked object therethrough in inverted unoriented position and to prevent passage of such object in oriented position, and a pusher for pushing objects in said chute laterally against said testing die; and
   (4) means to cause transfer of a properly oriented object from the discharge end of the chute into a pocket of the index table when the pocket moves into alignment with said discharge end.

3. Apparatus as claimed in claim 2 wherein there are provided (5) means responsive to positioning of said index table (2) with respect to said discharge end of said chute (1) for periodically actuating said pusher toward said testing die (3).

4. Apparatus as claimed in claim 3 wherein said position responsive means (5) comprises (6) co-acting cam and follower means provided on said index table (2) and said chute (1), and said cam and follower means (6) include (7) lost motion means which are operable when said pusher of said ejector means (3) pushes a properly oriented object against said testing die.

5. Apparatus as claimed in claim 3 wherein the surface of said index table (2) between adjacent pockets moves in obturating relationship with said lower discharge end of said chute (1) to retain objects therein, and said position responsive means is rendered operative only when said surface is in said obturating relationship.

References Cited by the Examiner

UNITED STATES PATENTS

| | | | |
|---|---|---|---|
| 2,505,468 | 4/1950 | Forca | 221—9 |
| 2,886,157 | 5/1959 | Hall | 193—43 |
| 3,044,660 | 7/1962 | Troll | 193—43 X |

M. HENSON WOOD, Jr., *Primary Examiner.*

J. ERLICH, *Assistant Examiner.*